United States Patent [19]

Lefevre

[11] Patent Number: 5,667,093
[45] Date of Patent: Sep. 16, 1997

[54] LOCK CAP FOR A MOTOR VEHICLE FUEL FILLING PIPE

[75] Inventor: Jean-Pierre Lefevre, Chaumont-en-Vexin, France

[73] Assignee: Paul Journee S.A., Colombes, France

[21] Appl. No.: 326,462

[22] Filed: Oct. 20, 1994

[30] Foreign Application Priority Data

Oct. 26, 1993 [FR] France .................. 93 12765

[51] Int. Cl.⁶ ............................................ B65D 41/06
[52] U.S. Cl. ...................... 220/293; 220/86.2; 220/210; 220/297
[58] Field of Search ................. 220/293, 297, 220/210, 213, 86.1, 86.2, DIG. 32, 33, 203.01–203.23

[56] References Cited

U.S. PATENT DOCUMENTS

| 2,696,100 | 12/1954 | Nehls .................. 70/169 |
| 2,797,841 | 7/1957 | Kopp .................. 220/297 |
| 3,164,288 | 1/1965 | Boomgaard .................. 220/DIG. 32 X |
| 3,402,580 | 9/1968 | Speck .................. 70/169 |
| 4,020,970 | 5/1977 | Koscik et al. .................. 220/293 |
| 4,079,855 | 3/1978 | Avrea .................. 220/DIG. 32 X |
| 4,136,795 | 1/1979 | Crute et al. .................. 220/DIG. 32 X |
| 4,231,485 | 11/1980 | Aimar . |
| 4,339,055 | 7/1982 | Hutzenlaub .................. 220/293 X |
| 4,579,244 | 4/1986 | Fukata .................. 220/DIG. 33 X |
| 4,779,755 | 10/1988 | Harris .................. 220/DIG. 33 X |
| 5,279,439 | 1/1994 | Kasugai et al. .................. 220/DIG. 33 X |

FOREIGN PATENT DOCUMENTS

| 0429336 | 5/1991 | European Pat. Off. . |
| 2049159 | 3/1971 | France . |
| 2436684 | 9/1979 | France . |
| 2585335 | 1/1987 | France . |
| 2657328 | 5/1978 | Germany . |
| 8136984 | 8/1985 | Germany . |
| 1237176 | 6/1971 | United Kingdom . |

OTHER PUBLICATIONS

French Search Report dated 21 Jul. 1994.

*Primary Examiner*—Stephen P. Garbe
*Attorney, Agent, or Firm*—Morgan & Finnegan, LLP

[57] ABSTRACT

The invention relates to a cap for closing the filling pipe of a fuel tank in a motor vehicle, of the kind comprising a rotatable locking mechanism which cooperates with a complementary part formed on the end of the pipe. The cap comprises at least two stops disposed axially opposite one another between which a portion of a radial collar formed on the end of the pipe is received when the cap is in the closed position. The body of the cap further comprises two parts assembled by elastic engagement, each of which comprises one of said two axial stops.

11 Claims, 3 Drawing Sheets

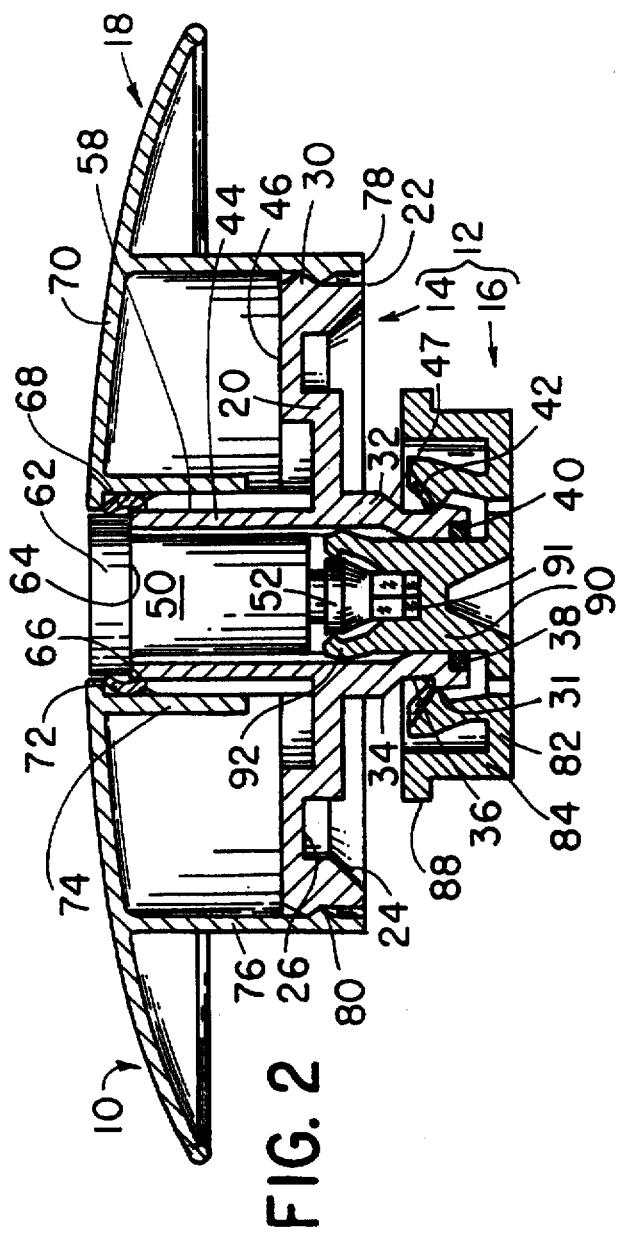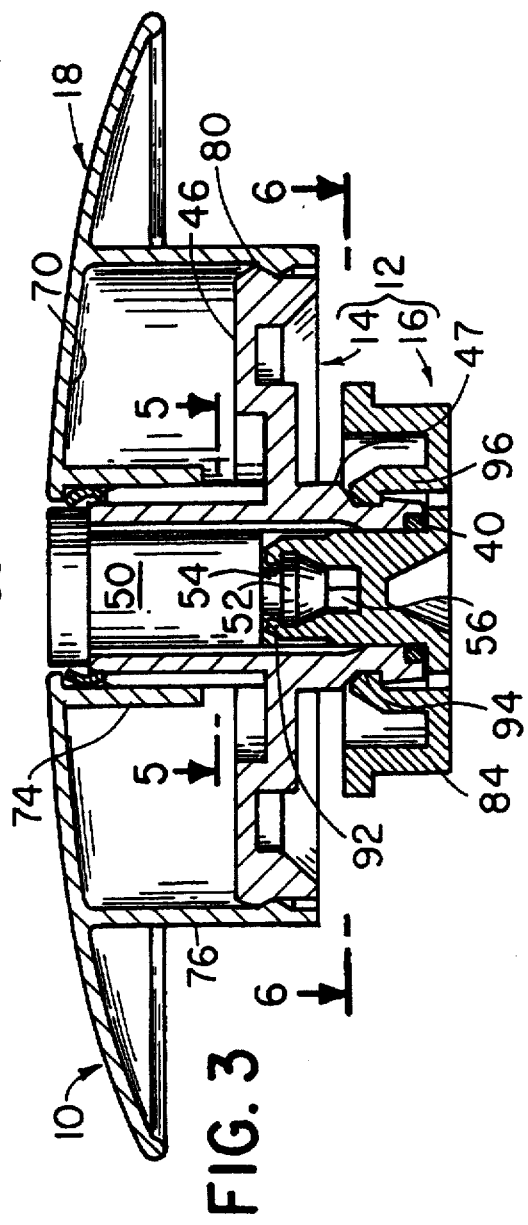

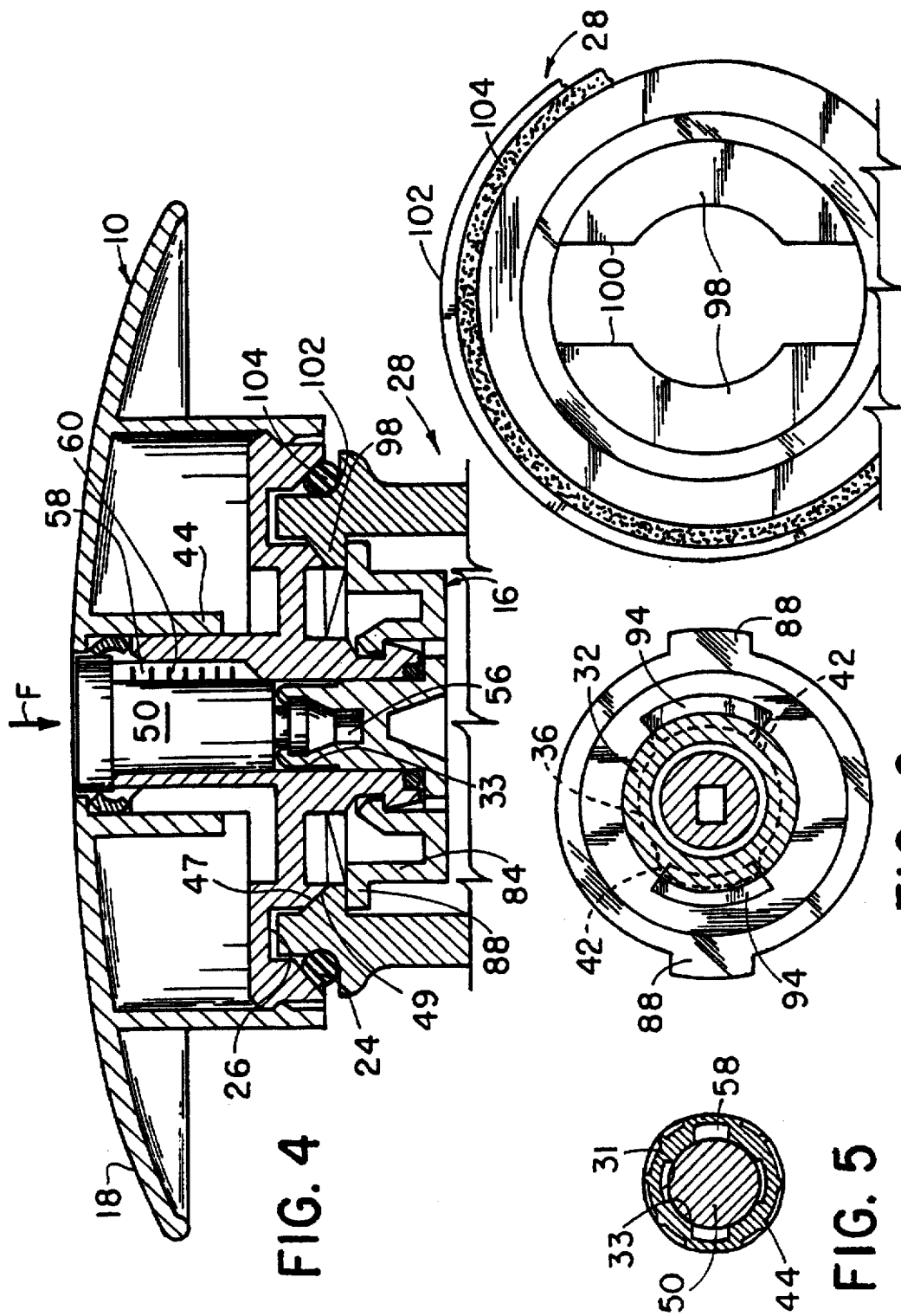

LOCK CAP FOR A MOTOR VEHICLE FUEL FILLING PIPE

BACKGROUND OF THE INVENTION

1. Field of the Invention

The present invention relates to a cap for closing a filling pipe of a fuel tank of a motor vehicle.

The invention more particularly relates to a cap of the kind comprising a rotatable locking mechanism which cooperates with a complementary part formed on the free end of the pipe and which comprises at least two stops disposed axially opposite one another between which a portion of a radial collar formed on the end of the pipe is received when the cap is in the closed position.

2. Prior Art

In the most widely used form the locking mechanism is provided by locking lugs which extend over a limited angular sector and which can be introduced into notches formed in the radial collar of the end of the pipe to form a locking cap known as a "quarter turn cap".

Known designs of such a kind of cap with rotational locking are particularly complex and require in particular the assembly of numerous components, both for the production of the body of the cap and also for the assembly of a lock when the cap is equipped therewith.

SUMMARY OF THE INVENTION

The object of the invention is to provide a new design of cap which is particularly simple, in which the number of components is reduced, which facilitates assembly and which enables in particular the automation of the different operations resulting in the manufacture of a cap for closing the filling pipe of a fuel tank.

For this purpose, the invention proposes a cap of the kind mentioned above, wherein the body of the cap comprises two parts assembled by elastic engagement and each part comprises one of two axial stops.

The present invention provides a cap for closing a filling pipe of a fuel tank of a motor vehicle, of the kind comprising a rotatable locking mechanism which cooperates with a complementary part formed on an end of the pipe, wherein cap includes a body comprising first and second body parts assembled by elastic engagement, each of first and second body parts including one of at least two axial stops disposed axially opposite one another between which a portion of a radial collar on the end of the pipe is received when the cap is in the closed position.

Preferably, the first body part comprises a locking plate, the lower face of which cooperates in tight manner with a corresponding seat formed on an upper end of the pipe and includes a first axial stop protrudingly formed therefrom and an engaging member disposed therefrom for catching, by elastic axial engagement, a complementary engaging member formed on the second body part.

More preferably, the engaging member comprises an engaging skirt which extends axially from the lower face of the locking plate, the peripheral surface of which includes an outer radial groove in which at least one engaging lug formed on the second body part is received.

More preferably, the second body part comprises a base, the upper face of which is provided with the complementary engaging member, on which a second axial stop is protrudingly formed.

Still more preferably, the base of the second body part has a central centering core which is received inside the engaging skirt of the first body part.

Preferably, the complementary engaging member is formed by two diametrally opposed engaging lugs which are received by the outer radial groove of the engaging skirt.

Preferably, the second axial stop is formed by sections of a radial collar, and the cap further includes a device provided for the rotational immobilization and indexing of an angular position of the first body part in relation to the second body part.

More preferably, the indexing device comprises an indexing finger which is rotationally connected to the first body part and which penetrates into a recess having a complementary profile formed in the centering core of the second body part.

More preferably, the rotational immobilization device comprises a lock, a barrel of which is rotationally connected to the second body part and rotatably mounted in a lock body.

Still more preferably, a component emerging from the barrel is fixed axially to the second body part by elastic engagement.

More preferably, the central core of the second body part comprises at least one engaging finger which is received in an inner radial groove formed in the component emerging from the barrel.

More preferably, the lock body is formed by a skirt extending axially from the upper face of the locking plate.

Preferably, the cap further comprises a covering lid.

More preferably, the covering lid is fixed onto the locking plate by elastic engagement.

Other features and advantages of the invention will become apparent from reading the following detailed description of preferred embodiments of the invention, which is given by way of example only, and with reference to the accompanying drawings.

BRIEF DESCRIPTION OF THE DRAWINGS

FIG. 2 is an axial sectional view of the three components illustrated in FIG. 1 with the lid fitted to the first part and the second part partially fitted to the first part;

FIG. 3 is a similar view to that shown in FIG. 2, in which the second part is illustrated in the mounted and fitted position on the first part;

FIG. 4 is an axial sectional view of the cap illustrated in FIG. 3 which is represented in the mounted and locked position on the upper part of a pipe of a fuel tank of a motor vehicle;

FIGS. 5 and 6 are sectional views along lines 5—5 and 6—6 of FIG. 3; and

FIG. 7 is an end view, along arrow F of FIG. 4, of the upper part of the end of the pipe.

DETAILED DESCRIPTION OF PREFERRED EMBODIMENTS OF THE INVENTION

Figure 1:
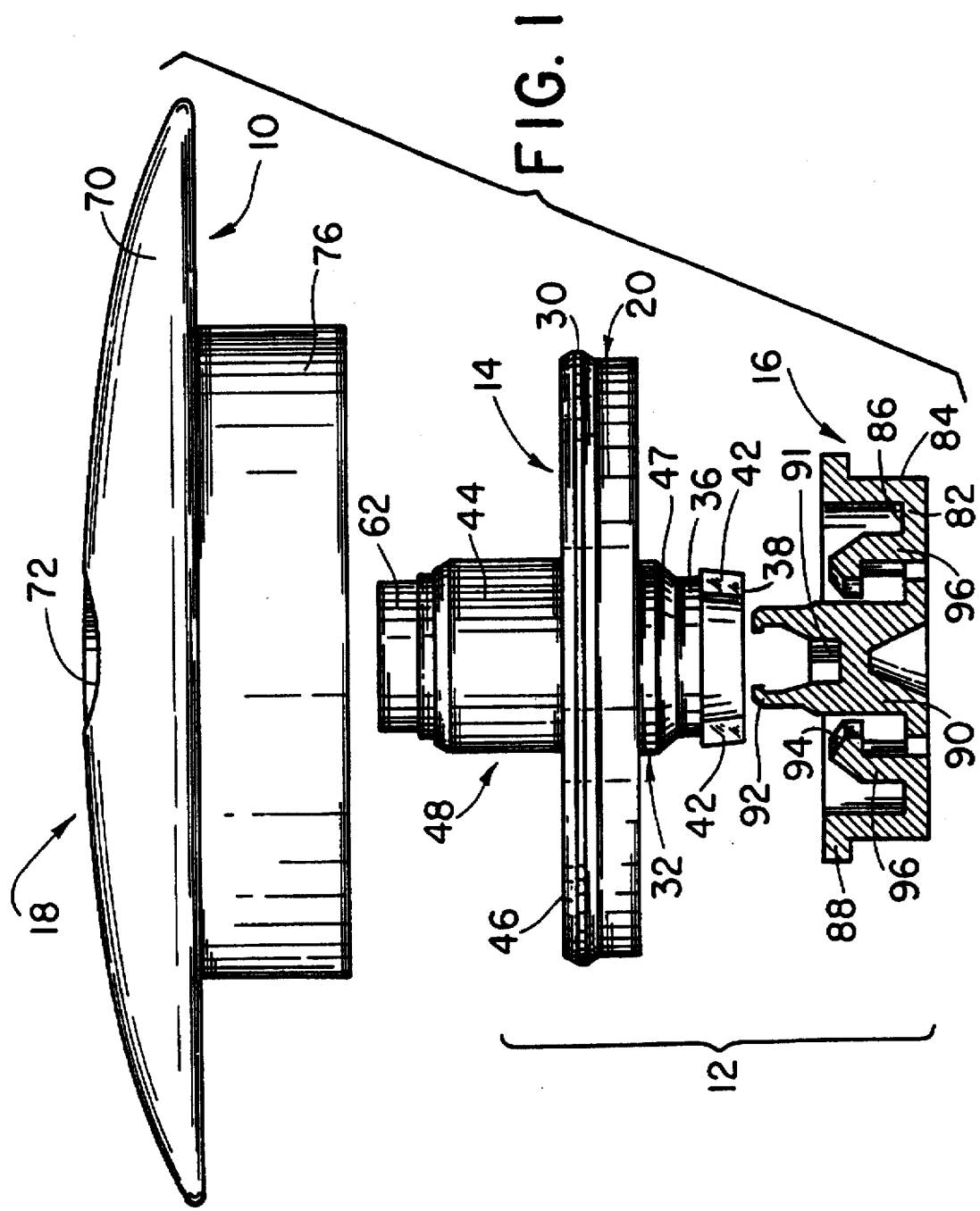
FIG. 1 is an exploded view of the two parts of the body of the cap and its lid, the second part being illustrated in axial section.

The cap 10 illustrated in the Figures is essentially formed by a cap body 12 in two (body) parts 14,16 and a lid 18. The first part 14 of the cap body 12, which is the upper part when one studies the Figures, is also referred to as the disk, and the second lower part 16 is also referred to as the cup. The components 14,16 and 18 have a general rotational shape around a vertical axis when studying the Figures.

The disk 14 is essentially formed by a locking plate 20, in which the lower face 22 turned towards the cup 16 comprises a conical sealing bearing surface 24 and an annular clearance 26 which are designed to cooperate with the upper part of a connection piece or filling pipe 28 as illustrated in FIGS. 4 and 7. This will be discussed further hereinbelow. The cylindrical lateral wall of plate 20 comprises a projecting outer radial rib 30. In its central part, the locking plate 20 is extended vertically downwards by an engaging annular cylindrical skirt 32. The outer cylindrical surface 34 of the skirt 32 has a profiled radial groove 36 and the end radial face 38 has a recess which receives an O-ring seal 40. As can be seen in FIG. 6, the radial groove 36 is delimited axially downwards by two arc-shaped sections of an outer radial shoulder 42. The disk 14 also comprises a cylindrical annular upper skirt 44 which extends vertically above the upper face 46 of the locking plate 20. The upper skirt 44 forms the fixed body of a lock 48 in which the barrel 50 is rotationally mounted. The rod 52 emerging from the barrel 50 comprises a radial groove 54 and terminates in an end portion 56 having a rectangular section. As can be seen in FIG. 4, in its wall the skirt 44 comprises a vertical axial recess 58 designed to house tumblers 60 of the barrel 50 and thus prevent when locked the rotation of the barrel 50 in relation to the skirt 44. The upper part of the barrel 50 comprises a radial collar 62, the lower face 64 of which rests on the upper annular face 66 of the skirt 44. A seal in the form of ring 68 is also provided at the upper part of the skirt 44 (lock body).

The lid 18 essentially consists of a dome-shaped upper shell 70 which includes a central hole 72 giving access to the upper face of the barrel 50 and which axially extends towards the interior of the cap by an inner cylindrical annular skirt 74 in which the skirt 44 is slidably received. The shell 70 also comprises an external cylindrical annular skirt 76 which includes on its inner face, and in the vicinity of its end annular edge 78, a rib 80 which is designed to cooperate by elastic engagement with the rib 30 of the locking plate 20 so as to ensure connection between the lid 18 and the disk 14 when the two components are in assembled configuration as shown in FIG. 2.

The lower face 22 of the locking plate 20 also has two axial extensions protruding vertically downwards 47, (as illustrated in FIG. 4). Each extension axially terminates in the form of an inclined ramp 49, the ramps 49 forming the first axial stops of the cap body 12 within the meaning of the invention.

The second cup-shaped part 16 is essentially formed by a plane transversal base 82 having a peripheral annular cylindrical skirt 84 extending axially upwards from the upper face 86 thereof. The upper edge of the skirt 84 includes two arc-shaped sections or axial locking stops 88 of an outer radial collar which form the second axial stops of the cap body 12 within the meaning of the invention. The cup 16 also has in its center a central guiding and centering core 90 which extends vertically upwards from the upper face 86 and which is designed to be received in the inner cylindrical bore or cylindrical wall 33 of the engaging skirt 32. The core 90 includes a recess 91, the cross section of which complements the section of the rectangular profiled end 56 of the component 52 emerging from the barrel 50.

An inner radial engaging indexing finger 92 is formed at the upper part of the guide core 90 and is designed to be received by elastic engagement in the groove 54 formed in the rod 52 emerging from the barrel 50. The locking finger 92 may be formed by a complete inner radial rib extending twice around the core 90 or by sections of such a rib. As will be explained below, in order to allow the elastic engagement of the fingers 92 in the groove 54, the inner cylindrical wall 33 of the engaging skirt 32 comprises two diametrally opposed axial recesses 31.

The cup 16 further comprises two engaging lugs 94 in the form of sections of an outer radial collar which are formed on the upper ends of vertical connecting arms 96 extending upwardly from the upper face 86 of the base 82. The profile of the locking lugs 94 is designed so that they can be received by the groove 36 formed in the engaging skirt 32.

In accordance with the teaching of the invention, assembly of the two parts 14 and 16 of the cap body 12 is performed by elastic engagement as illustrated in FIGS. 2 and 3. In the partially fitted position illustrated in FIG. 2, the guide core 90 has penetrated into the cylindrical bore or cylindrical wall 33 of the engaging skirt 32, but the engaging fingers 92 and the engaging lugs 94 have not yet penetrated into their respective grooves 54 and 36. The assembly of the two components is complete when, after axial pressure tending to bring together the two components, the fingers 92 and the lugs 94 simultaneously penetrate into the grooves 54 and 36 as illustrated in FIG. 3. During assembly, the end 56 of the rod 52 emerging from the barrel 50 also penetrates into the complementary recess 91.

The axial engagement operation of the parts 14 and 16 brings about their relative immobilization preventing displacement, as well as the axial immobilization of the barrel 50 of the lock in the lock body (skirt 44). The barrel 50 is rotationally connected to the cup 16, and this unit is able to turn in relation to the disk 14 if a key is introduced into the barrel 50 to withdraw the tumblers 60, which, in the locked position, extend in the seat 58 (see FIG. 4).

As illustrated in FIGS. 4 and 7, and in a known manner, the cap 10 is designed to tightly seal the upper part of the filling pipe 28 according to the technique known as "quarter turn locking". For this purpose, the pipe 28 comprises an inner radial collar 98 having two diametrally opposed recesses 100 which are provided to enable the passage of the second axial locking stops 88 when the latter are introduced angularly opposite the recesses 100.

In the locked position illustrated in FIG. 4, the radial collar 98 is axially housed between the first axial stops 47 and the second axial stops 88 so as to ensure tight closing of the pipe by means of the conical bearing surface 24 which cooperates in tight manner with a seat 102 of the pipe 28 by the interposition of a seal 104 made in the form of an O-ring seal.

The unlocking of cap 10 to open the pipe 28 is performed by introducing a key into the barrel 50 so as to release the barrel 50 from a rotational point of view in relation to the lock body. This release enables a rotation of the cup 16 by a quarter turn in relation to the disk 14 and the upper end of the pipe 28 to again bring the axial stops 88 opposite recesses 100. Once this angular position has been achieved (not shown in the Figures), it is then possible to withdraw the cap 10 axially, upwards when studying FIG. 4.

The invention is not restricted to the embodiment described hereinabove. In particular, it may be used in the case of a cap 10 not having a lock, in which case the disk 14 comprises in its central part an indexing finger made of a single piece which performs the same angular indexing and rotational immobilization function of the disk 14 in relation to the cup 16.

What is claimed is:

1. A cap for closing a filling pipe of a fuel tank for a motor vehicle, said cap having a rotatable locking mechanism which cooperates with a complementary radial collar formed on an end of the pipe, wherein the cap includes a body comprising a first disk-shaped body part having a barrel therewithin, a first axial stop formed on said first body part and a second cup-shaped body part having a second axial stop formed on said second cup-shaped body part, said first and second body parts being assembled by elastic engagement, said respective first and second axial stops forming with said first and second body parts at least two axial stops spaced axially opposite one another between which a portion of the radial collar on the end of the pipe is directly received when the cap is in the closed position wherein the first body part has a locking plate and a depending skirt said skirt including a groove formed therein, one face of said locking plate bears selectively against a corresponding seat formed on an end of the pipe, a central guiding and centering core protruding from said second body part having an engaging member disposed therefrom, said engaging member being formed on the centering core for catching, by elastic axial engagement, a complementary engaging member on the barrel within the first body part, and at least one lug formed on the second body part for elastically engaging said locking plate groove.

2. A cap according to claim 1, further comprising a covering lid, the covering lid being fixed onto the locking plate by elastic engagement.

3. A cap according to claim 1, wherein said depending skirt which extends axially from the face of the locking plate, the peripheral surface of said depending skirt having said locking plate groove formed therein in which at least one of said lugs formed on the second body part is selectively received.

4. A cap according to claim 3, wherein the engaging member is formed by two diametrally opposed engaging lugs which are received by the outer radial groove of the engaging skirt.

5. A cap for closing a filling pipe of a fuel tank for a motor vehicle, said cap having a rotatable locking mechanism which cooperates with a complimentary radial collar formed on an end of the pipe, wherein the cap includes a body comprising a first body part having a first axial stop and a second body part having a second axial stop said first and second body parts being assembled by elastic engagement, said axial stops being spaced axially opposite one another between which a portion of the radial collar on the end of the pipe is received when the cap is in the closed position, the first body part having a lug engaging locking plate, one face of which bears against the corresponding seat formed on the end of the pipe and includes the first axial stop protrudingly formed therefrom and a central guiding and centering core protruding from said second body part having an engaging member disposed therefrom for elastic axial engagement, a complementary engaging member having at least one lug formed on the second body part for elastically engaging said lug engaging locking plate, the second body part having a base, a face of which is provided with said complementary engaging member, the second axial stop is protrudingly formed on the second body part wherein the base of the second body part has the central centering core which is received inside of the first body part.

6. A cap for closing a filling pipe of a fuel tank for a motor vehicle, said cap having a rotatable locking mechanism which cooperates with a complimentary radial collar formed on an end of the pipe, wherein said cap includes a body comprising a first body part having a barrel therewithin, a first axial stop formed on said first body part and a second body part having a second axial stop, said first and second body parts being assembled by elastic engagement, each of said two axial stops being spaced axially opposite one another and between which opposing and spaced axial stops a portion of the radial collar on the end of the pipe is received when the cap is in the closed position, the first body part having a locking plate and a depending skirt, said skirt including a groove formed therein, one face of said locking plate bears against the corresponding seat formed on the end of the pipe and includes the first axial stop protrudingly formed on said first body part a central guiding and centering core protruding from said second body part having an engaging member disposed therefrom for elastic axial engagement, a complementary engaging member having at least one lug formed on it for elastically engaging said locking plate groove, the second body part also having a base, a face of said base being provided with said complementary engaging member, the second axial stop is protrudingly formed on the second body part, and the cap further includes a device provided for the rotational immobilization and indexing of an angular position of the first body part in relation to the second body part.

7. A cap according to claim 6, wherein the device for rotational immobilization and indexing comprises an indexing finger which is rotationally connected to the first body part and which penetrates into a recess having a complementary profile formed in the centering core of the second body part.

8. A cap according to claim 6, wherein the rotational immobilization device comprises a lock, the cap having a lock body, said barrel being rotationally connected to the second body part and rotatably mounted in said lock body.

9. A cap according to claim 8, further comprising a component emerging from said barrel, wherein the barrel is fixed axially to the central guiding and centering core engaging member on said second body part by elastic engagement.

10. A cap according to claim 9, wherein the central core of the second body part comprises at least one engaging finger, said component emerging from said barrel has an inner radial groove formed therein for receiving said engaging finger.

11. A cap according to claim 8, wherein the lock body is formed by a skirt extending axially from the upper face of the locking plate.

* * * * *